United States Patent Office 3,846,227
Patented Nov. 5, 1974

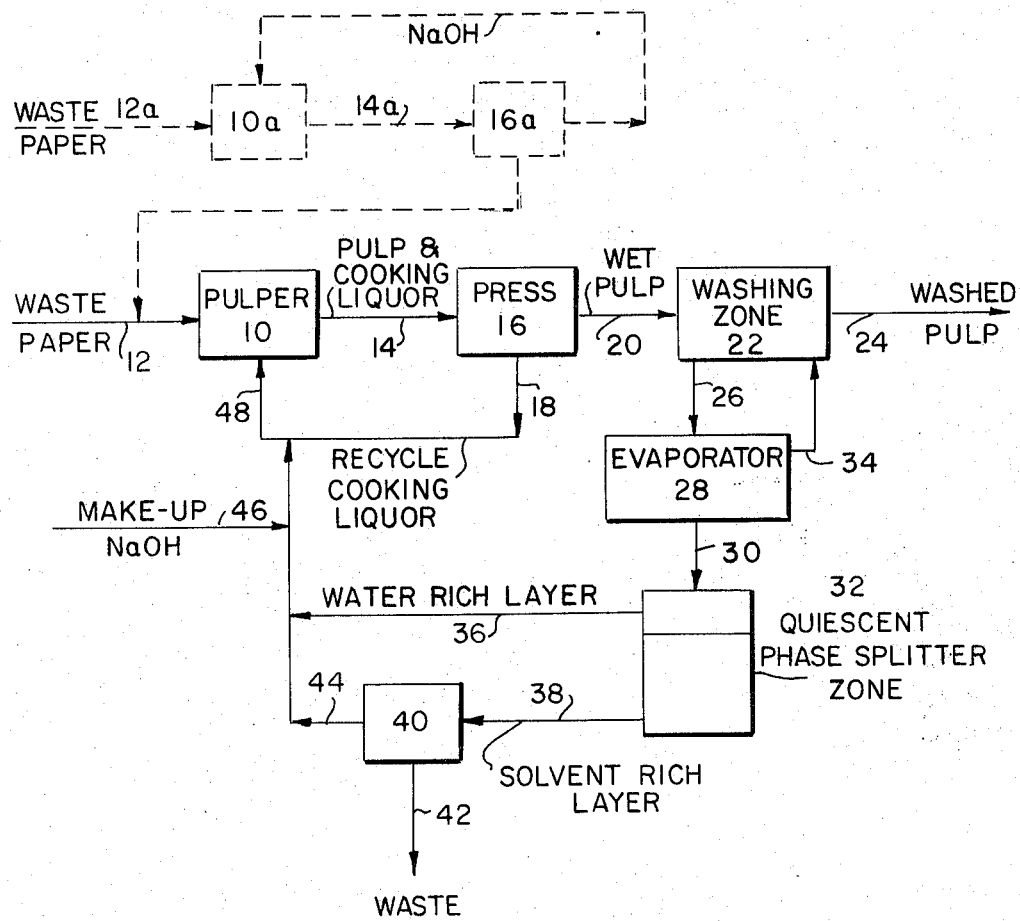

3,846,227
DEINKING OF WASTE PAPER WITH AN AQUEOUS SOLUTION CONTAINING AN N-ALKYLLACTAM SOLVENT
Thomas S. Mestetsky, Belvidere, N.J., and Bruce G. Webster, Cincinnati, Ohio, assignors to GAF Corporation, New York, N.Y.
Filed Nov. 1, 1972, Ser. No. 302,657
Int. Cl. D21c 5/02
U.S. Cl. 162—5       36 Claims

ABSTRACT OF THE DISCLOSURE

Waste paper is effectively deinked by contact with an aqueous treating composition containing an N-alkyllactam solvent at a temperature of from about 110° F. to about 210° F. The N-alkyllactam solvent is not consumed in the treating process and can be effectively separated from the waste material removed from the paper being treated for reuse in the contacting of additional quantities of waste paper. The use of N-cyclohexyl pyrrolidone, N-t-butyl pyrrolidone and N-t-octyl pyrrolidone is particularly advantageous in that simplified regeneration techniques of appreciable technical and economic significance can be employed therewith. The aqueous treating composition will generally contain from about 0.5 to about 200 parts by weight of water, from about 0.05 to about 1 part by weight of a water-soluble, non-volatile, inorganic ionic compound, e.g., NaOH, and from about 1 to about 99 parts by weight of the N-alkyllactam solvent. The deinking is carried out at a temperature of from about 110° F. to about 210° F. Difficult-to-deink grade material, such as waste paper containing thermoplastic and elastomeric coatings, laminates and adhesives, can be effectively and conveniently deinked by the N-alkyllactam solvent composition.

BACKGROUND OF THE INVENTION

Field of the Invention

This invention relates to the deinking of waste paper. More particularly, it relates to a novel composition and process for the deinking of waste paper, including difficult-to-deink paper.

Description of the Prior Art

The recycling and reuse of waste paper is an important environmental aspect of the enormous and continually growing use of paper in nearly all aspects of modern business and social activities. This conversion of waste paper to fibrous material, advantageously of a quality essentially equivalent to virgin pulp, involves what is generally known in the art as "deinking." In conventional deinking operations, printed, colored and coated paper is generally treated with hot, alkaline, aqueous solutions generally containing a variety of additives, such as detergents, emulsifiers, dispersants and the like. Such operations are reasonably satisfactory in the deinking of paper that is practically free of the variety of synthetic thermoplastic and elastomeric substances now increasingly used in printing inks, functional coatings, laminates, adhesives, etc. The conventional deinking compositions are not suitable, however, for the acceptable deinking of so-called difficult-to-deink grade materials, namely those waste paper materials having such synthetic thermoplastic and elastomeric substances associated therewith as is increasingly the case with respect to the inks, coatings, laminates, adhesives and the like increasingly used in wide varieties of modern paper applications.

The failure to adequately remove the various contaminating substances associated with difficult-to-deink grade waste paper results in their build-up in the paper making system in which the recycled material is being incorporated, thereby causing costly and time-consuming breaks on the paper-making machine and the production of non-saleable paper of substandard quality, i.e., so-called "broke." As a result, the deinking of waste paper by conventional techniques is frequently confined to waste paper not having such synthetic, thermoplastic and elastomeric substances thereon that can not be effectively removed by conventional deinking compositions and techniques. As a result, the lower quality, more difficult-to-deink grade waste papers are not generally reprocessed, despite their generally less expensive nature and the ever growing need for the processing of such waste on the basis of both commercial and environmental consideration.

It is an object of the present invention, therefore, to provide an improved process and composition for the deinking of waste paper.

It is another object of the invention to provide an improved process and composition of particular utility with respect to the deinking of difficult-to-deink grade material.

It is another object of the invention to provide a process and composition for the effective removal of synthetic thermoplastic and elastomeric substances from the waste paper being treated.

With these and other objects in mind, the invention is hereinafter set forth in detail, the novel features thereof being particularly pointed out in the appended claims.

SUMMARY OF THE INVENTION

N-alkyllactams have been found highly effective in the deinking of waste paper, particularly in the treatment of difficult-to-deink grade materials. The N-alkyllactams may be employed in amounts of generally from about 0.5% to about 99.5% by weight, based on the total weight of the aqueous treating composition in which they are employed, with amounts of from about ¾% to about 25% by weight being particularly advantageous in many deinking applications. The effectiveness of the N-alkyllactam solvent is enhanced by the incorporation in the aqueous treating composition of a small amount of sodium hydroxide or other suitable water-soluble, non-volatile, inorganic ionic compound. The aqueous treating composition and the waste paper being treated are contacted at a temperature within the range of from about 110° F. to about 210° F. The N-alkyllactam solvent employed in the practice of the invention is not consumed and can be recovered for reuse in the contacting of additional quantities of the waste paper being deinked. Particularly advantageous overall operations are achieved by the use of N-cyclohexyl pyrrolidone, N-t-butyl pyrrolidone or N-t-octyl pyrrolidone in that the particular lactam solvents have an additional advantage in the convenient and economically significant manner in which they can be recovered for continuous recycle and reuse.

DESCRIPTION OF THE INVENTION

The deinking of waste paper, particularly the deinking of difficult-to-deink grade waste paper, is significantly improved and enhanced, in the practice of the present invention, by the use of N-alkyllactam solvents in the aqueous treating composition employed. The execptional solventing action of the N-alkyllactam solvents causes the waste paper being treated to become readily deinked so that an acceptable pulp product can be withdrawn from the subsequent washing stages, leaving a used N-alkyllactam solvent composition that can be effectively regenerated and reused in the treatment of additional quantities of the paper being deinked. In particular embodiments of the present invention, as herein discussed, particularly economical recovery of the lactam solvent can be achieved, enhancing the overall operation for the continuous deinking of waste paper.

In the practice of the present invention, the N-alkyl-lactam solvent employed in the aqueous treating composition is preferably an N-alkyl pyrrolidone or N-alkyl piperidone, having generally from about 1 to about 16 carbon atoms in the alkyl group, said alkyl group including N-cycloalkyl groups. Most generally preferred are the N-lower alkyl groups of 1 to 6 carbon atoms, including N-lower cycloalkyl groups, such as the N-cyclohexyl group. Illustrative of the various N-lower alkyl lactams thus suitable for use in the practice of the present invention include, but are not limited to, the following illustrative examples: N-cyclohexyl pyrrolidone, N-t-butyl pyrrolidone, N-t-octyl pyrrolidone, N-methyl pyrrolidone, N-ethyl pyrrolidone, N-propyl pyrrolidone, N-isopropyl pyrrolidone, N-n-butyl pyrrolidone, N-n-hexyl pyrrolidone, N-n-octyl pyrrolidone, N-n-isooctyl pyrrolidone, N-n-decyl pyrrolidone, N-undecyl pyrrolidone, N-dodecyl pyrrolidone, N-tetradecyl pyrrolidone, N-hexadecyl pyrrolidone, N-methyl piperidone, N-ethyl piperidone, N-propyl piperidone, N-isopropyl piperidone, N-t-butyl piperidone, N-n-butyl piperidone, N-n-hexyl piperidone, N-n-octyl piperidone, N-isooctyl piperidone, N-n-decyl piperidone, N-undecyl piperidone, N-dodecyl piperidone, N-tetradecyl piperidone, N-hexadecyl piperidone, and the like.

The N-alkyllactam solvents employed, i.e., the N-alkyl pyrrolidones and N-alkyl piperidones, are lactams of the gamma- and delta-amino acid derived from butyric acid, valeric acid and caprylic acid. Since such substances are cyclic acid amides, they are neutral and, therefore, serve in the practice of the present invention as physically dissolving absorbents, such substances having a particular affinity for the dissolving of printing inks and the various synthetic, thermoplastic and elastomeric substances frequently employed with printing inks, laminates, adhesives, and the like frequently encountered in difficult-to-deink grade, lower quality paper waste material, in the processing of which the present invention represents a highly advantageous and commercially significant advance in the art.

In carrying out the waste paper deinking of the present invention, the amount of pulp being treated will generally range from about 1% to about 20% by weight or more based on the weight of the aqueous treating composition employed. Higher pulp contents are generally not feasible due to the mechanical limitations of the pulping equipment. The pulp/treating composition ratio employed in any given application will vary depending upon a number of factors, such as the quality of the paper to be deinked, the particular lactam solvent employed, the amount of lactam solvent employed, the contacting temperature, the nature and quantity of other ingredients, such as known conventional pulping liquor ingredients, employed and the like. In this regard, it should be noted that the N-alkyllactam solvent can be employed in widely varying proportions, generally ranging from about 0.5% to about 99.5% by weight based on the total weight of the aqueous treating composition. N-alkyllactam solvent contents of from about 0.5% to about 50%, frequently from about ¾% to about 25% by weight based on the total weight of the aqueous treating composition are suitable and advantageous in many applications.

In conventional deinking compositions, caustic soda is ordinarily employed together with conventional additives such as detergents or emulsifiers to supplement the action of the caustic soda. In the deinking of waste paper through the use of N-alkyllactam solvents as herein provided, the solvent action of the N-alkyllactam solvents is enhanced by likewise employing the caustic soda of the conventional deinking composition in the aqueous treating composition of the present invention. The enhanced deinking action of the N-alkyllactam solvents can be achieved, however, not only with said caustic soda, or in an alkaline solution in general, but in aqueous treating compositions containing a wide variety of inorganic, non-volatile, water-soluble ionic compounds. Such compounds are, in general, those containing a cation taken from Groups I, II and II of the Periodic Table. Suitable compounds for use in the aqueous treating compositions of the present invention include, but are not necessarily limited to such compounds containing a cation taken from the group consisting of sodium, potassium, calcium, iron, aluminum and magnesium. Representative compounds illustrating the compounds thus suitable for use in enhancing the deinking effectiveness of N-alkyllactam solvents in particular embodiments of the invention include the generally preferred $NaOH$, $KOH$, $Ca(OH)_2$, $FeCl_3$, $Al_2(SO_4)_3$, $Na_3PO_4$, $Na_2CO_3$, $Mg(OH)_2$, $K_2CO_3$ and the like. It is believed that the incorporation of ionic compounds of this general character serves to reduce the water solubility of the N-alkyllactam solvent in the aqeous treating composition at the operating conditions employed in the practice of the invention. The solvent is thereby rendered available in undissolved form for highly effective paper deinking and pulping action, it being understood that the water serves as a carrier to facilitate the desired contacting of the N-alkyllactam solvent with the waste paper being treated.

In such generally preferable embodiments, the subject aqueous treating compositions will generally contain from about 0.5 to about 200 parts by weight of water, from about 0.05 to about 1 part by weight of said inorganic compound as indicated above, and from about 1 to about 99 parts by weight of the N-alkyllactam solvent. In many applications, the lactam solvent content will range from about 1 to about 200 parts by weight, with a lactam solvent content of from about ¾% to about 25% by weight based on the total weight of said aqueouc treating composition frequently being sufficient as noted above. It should also be specifically noted that it is within the scope of the present invention to incorporate conventional deinking composition additives in the compositions of the present invention for their intended purpose. Thus, conventionally employed detergents, surfactants, emulsifiers and the like can also be employed in conventional amounts for their usual purpose in the deinking compositions of the present invention. For example, it has been found generally advantageous to employ up to about 0.2 parts by weight surfactant in the generally preferred aqueous treating composition indicated hereinabove.

In the deinking process herein disclosed and claimed, the waste paper being treated and the aqueous treating composition are contacted at an elevated treating composition temperature generally within the range of from about 110° F. to about 210° F., advantageously from about 120° F. to about 200° F. While the operating temperature can thus vary widely, it has been found that the heating of the aqueous treating composition to from about 150° F. to about 170° F. is generally convenient in many practical applications of the invention. It should also be noted that it is within the scope of the present invention to treat the paper to be deinked with, for example, an aqueous caustic treating solution in a preliminary treating operation to at least partially pulp the waste paper being treated prior to addition of the N-alkyllactam thereto to form the aqueous treating composition of the present invention. In such an embodiment, for example, the waste paper to be treated can be pre-treated with a caustic solution at room temperature and pressed to remove a portion of the treating liquor therefrom prior to addition of the N-alkyllactam solvent thereto and heating to the indicated temperature. In such instances, the lactam solvent can be sprayed or otherwise added to the moist pulp, the preliminary pressing serving to reduce the amount of liquid ot be heated in providing for the desired contacting of the aqueous treating composition with the paper being treated at the indicated conditions, effecting a further economy in the practice of the invention.

The deinking process of the present invention employing the aqueous treating composition of the invention comprises generally the contacting of the waste paper being treated with the aqueous treating composition in a pulping zone, the separation of a major portion of the aqueous treating composition from the resulting pulp, the subsequent washing of the pulp, and the recovery, regeneration and recycle of N-alkyllactam solvent for the continuous treatment of additional quantities of waste paper to be deinked. In general, the portion of the aqueous treating composition initially separated from the treated pulp, as in a conventional press, can be recycled directly back to the pulping zone. The wash water subsequently removed from the washing zone in which the treated pulp is washed will contain additional quantities of the N-alkyllactam solvent that should be recovered in highly desirable, economically advantageous commercial embodiments of the invention. The solvent thus present in the wash water will, it should be noted, contain the various contaminants and other waste materials removed from the paper being treated for ultimate passage from the treating system and disposal as waste material. In the separation of the N-alkyllactam solvent from the wash water and from said waste material, the wash water removed from the washing zone is conveniently passed to an evaporator zone in which the wash water solution may be concentrated as by vacuum evaporation of a portion of the water content thereof. The concentrated aqueous solution of N-alkyllactam solvent with dissolved waste material can thereupon be processed, as by a conventional distillation, to recover a purified N-alkyllactam solvent-water stream separated from the waste material removed from the treated pulp. When employing N-cyclohexyl pyrrolidone, N-t-butyl pyrrolidone and N-t-octyl-pyrrolidone as the N-alkyllactam solvent of the invention, the properties of these particular lactam solvents enable the hot concentrated wash solution obtained upon preliminary evaporation to be separated into two separate and distinct liquid layers or phases upon heating to the so-called cloud point temperature associated with each of these particular lactam solvents. The cloud point represents the temperature at which the concentrated aqueous solution of the indicated lactams separater into a first, water-rich layer and a second, solvent-rich layer that can readily be separated from each other. The solvent-rich layer containing, therefore, a substantial proportion of the waste material present in the wash water solution can thereafter be purified by economically advantageous methods, such as by filtration, carbon adsorption, evaporation and the like, to obtain a purified or regenerated lactam solvent-water stream that can readily be recycled back to the pulping zone for contact with additional quantities of the paper being deinked. Such more economical recovery and regeneration, permissible because of the indicated phase separation resulting from the characteristics of said N-cyclohexyl pyrrolidone, N-t-butyl pyrrolidone and N-t-octyl pyrrolidone, represents a further highly significant advantage obtained in the practice of the present invention for effectively deinking waste paper, particularly the lower quality, more difficult-to-deink grade, less expensive paper materials with respect to which the present invention is of particular significance.

For purposes of the desired phase separation of the wash solution in particular embodiments of the invention, the aqueous wash solution is conveniently passed into a quiescent zone in which the indicated separation into distinct water-rich and solvent-rich layers occurs. As previously indicated, the aqueous wash solution from the washing zone will generally be initially concentrated by evaporation of a portion of its water content and thereafter heated to its cloud point temperature. It will be understood, however, that in some instances it might not be necessary or desirable to initially concentrate the aqueous wash solution, particularly when a relatively small amount of wash water is employed. Similarly, it might be advantageous and sufficient to concentrate the wash solution to a specified degree, but not necessary to further heat the hot concentrated solution in that the temperature thereof is at or in excess of the cloud point temperature of the particular solution. The cloud point temperature of aqueous solutions of the specified lactam solvents thus represents not a fixed and inflexible temperature point, but a temperature dependent upon a number of operating factors such as the particular lactam solvent employed, the proportion of said solvent and of water in the aqueous wash solution, the nature and amount of waste materials removed from the paper being treated that are present in the wash solution, and the like. In the practice of the present invention, the cloud point temperature of a given aqueous wash solution will be readily apparent to those skilled in the art employing a particular lactam solvent in a given deinking application employing specific conditions for the washing of the treated pulp.

The invention is hereinafter described with respect to the use of preferred N-alkyllactam solvent and with reference to the accompanying drawing, it being understood that the paper being deinked may be printed, colored and coated paper such as is treated in conventional deinking operations, but advantageously is such paper containing synthetic, thermoplastic and elastomeric substances not successfully accommodated in conventional operations. The contaminants resulting from the increasing use of a variety of said synthetic, thermoplastic and elastomeric substances in inks, functional coatings, laminates, adhesives and the like render such paper to be treated difficult-to-deink grade material. Such material is generally not processed in conventional deinking operations, but may be treated to advantage in the practice of the present invention. The invention has particular significance, therefore, in the deinking of such difficult-to-deink grade material. In the drawing, waste paper to be deinked is passed to conventional pulper 10 through line 12 for contact therein with an aqueous treating composition containing an N-alkyllactam solvent at a composition cooking temperature of from about 110° F. to about 210° F. Treated pulp and cooking liquor are passed from pulper 10 through line 14 to press 16 wherein a major portion of the aqueous treating composition is squeezed from the pulp for recycle through line 18 to pulper 10 for contact with additional quantities of waste paper to be treated. The pressed pulp leaving press 16 through line 20 passes to washing zone 22 for counter-current contact therein with wash water to remove N-alkyllactam solvent, together with waste material removed from the paper being treated, from the treated pulp, which is withdrawn from washing zone 22 through line 24.

The wash water solution removed from washing zone 22 through line 26 thus contains lactam solvent advantageously to be recovered and reused in the economical operation of the deinking process of the present invention. The wash water can be concentrated, as in vacuum evaporator 28, to produce a hot, concentrated wash solution that is passed through line 30 to quiescent zone 32 in which the highly advantageous phase separation, achievable when employing the preferred solvents specified, is accomplished. If necessary or desired, the hot wash water concentrate from evaporator 28 can be further heated to reach the cloud point temperature under the particular circumstances pertaining to a given concentration of the particular preferred N-alkyllactam solvent employed and a given amount of particular waste materials associated therewith. Water vapor removed from evaporator 28 in the concentration of the wash solution can be condensed and recycled through line 34 to washing zone 22 for use in the washing of additional quantities of pulp.

The upper, water-rich layer in zone 32, having a small amount of solvent and some accompanying waste material present herein, can be withdrawn through line 36 for recycle to pulper 10. The bottom, solvent-rich layer in zone 32 is withdrawn through line 38 for solvent purification treatment by the removal of waste materials therefrom in solvent purification zone 40. Separated waste materials are withdrawn from said zone 40 through line 42 for discharge. Such wastes constitute the accumulation of inks, coatings and the like removed from the treated paper, including the synthetic, thermoplastic and elastomeric substances used in the inks, coatings, laminates and adhesives associated with difficult-to-deink grade material treated in accordance with the invention. A purified solvent/water stream is withdrawn from said zone 40 through line 44 for recycle to pulper 10. As shown in the drawings, therefore, the purified solvent stream in line 44, the water-rich stream in line 36, and makeup caustic or other inorganic admixture agent in line 46 can all be fed, at appropriate rates, to pulper 10, together with recycle cooking liquor in line 18, as is illustrated diagrammatically in the drawing by common recycle line 48 to pulper 10.

As is shown also in the drawings, the waste paper to be deinked can also be passed through line 12a to pulping zone 10a for pulping with an aqueous alkaline solution, e.g., a caustic solution, generally at room temperature, prior to deinking with the aqueous treating composition of the invention at the more elevated temperatures herein generally disclosed and claimed. The thus pre-treated pulp, in this embodiment, is advantageously passed through line 14a to press 16a for removal of a portion of the aqueous pre-treatment solution prior to passage, as through line 14b to contacting zone 10 for cooking with the aqueous treating composition containing N-alkyllactam solvent in accordance with the teachings of the present invention. The alkaline pre-treatment solution removed from the pulp in said press 16a can be recycled to pulping zone 10a for contact with additional quantities of waste paper.

It is within the scope of the invention to employ any one of several convenient techniques for the removal of waste materials from the solvent-rich stream passed to solvent purification zone 40. For example, it is found that filtration of said solvent-rich stream results in the removal of sufficient waste material to provide a purified solvent-water recycle stream suitable for recycle and reuse in the treatment of additional quantities of waste paper. The provision of a carbon adsorption bed in said zone 40 can likewise be employed in the purification of the solvent-rich stream withdrawn from quiescent zone 32. Solvent purification zone 40 can also comprise an evaporation zone from which a purified solvent-water stream can be withdrawn and condensed for said recycle and reuse. Said zone 40 may also, if desired, comprise a distillation zone although the simpler, less expensive methods of purification hereinabove indicated are generally preferred from an economic viewpoint. When less preferred lactam solvents, i.e., those not having the cloud point characteristics of phase separation mentioned above, are employed in the process of the invention, the concentrated wash water solution will generally be distilled to produce a purified solvent stream for recycle to pulper 10.

The invention is hereinafter described with reference to examples illustrating particular embodiments thereof, it being understood that the examples should not be construed as limiting the scope of the invention as hereinafter set forth in the appended claims. Unless otherwise indicated, the proportions of materials employed are in percent by weight. In addition to visual examinations of treated material, brightness measurements have also been taken in accordance with TAPPI suggested methods on a Hunter D–40 Reflectometer using both blue and green filters. Brightness/color was also measured in accordance with TAPPI suggested procedures on a Hunter D–25 Color Difference Meter for L=brightness, a=red/green, and b=blue/yellow.

EXAMPLE 1

A specially prepared testing grade of waste paper, obtained from Fort Howard Paper Company consisting of color printed, over varnish label stock repulped to give uniform sheets having a profusely color-specked appearance was employed, said paper being deemed by those in the art as very difficult to reclaim, i.e., difficult-to-deink, grade material. The deinking method employed was similar to that given in TAPPI Monograph 31 "Introduction to Deinking," page 151, Example 1, which correlates with deinking in a 16 ft. Hydrapulper at 190° F. using 4% caustic soda o.w.f. (on weight of fiber) on waste paper at 8% consistency, i.e., paper solids in the cooking liquor. Three grams (dry) of said deinking stock, 30 ml. of 3% caustic soda solution, specified amounts of water and of the N-alkyllactam pyrrolidone were cooked for 1 hour at 170° F. with additional water added to compensate for evaporation loss. The blend was run for 2 minutes at "Blend" speed in an Osterizer Classic VIII Model Blender. 600 ml. of water was added and a sheet of the treated material was formed on 60 mesh, vacuum sheet mold. The newly formed sheet was washed twice using 1 liter of water for each wash, reforming the sheet between washes. The reformed sheet was pressed and dried in a paper drier. The resultant paper from the sheet mold, called scan sheets, were tested for deinking efficiency by measuring brightness as indicated above. The sheets were also individually rated for colored speck removal, which is not readily apparent from the above instrumental measuring techniques. In one series of runs, the results of which are set forth in Table I, varying amounts of cyclohexyl pyrrolidone (CHP) were employed, the results indicating the effectiveness of said CHP for the desired deinking of difficult-to-deink grade material.

TABLE I.—VARIATION IN CHP CONTENT

| CHP in cooking liquor, volume percent | Hunter D-40 | | Hunter D-25 | | | Visual rating for specks |
|---|---|---|---|---|---|---|
| | Blue filter | Green filter | L | a | b | |
| 0 | 62.4 | 69.6 | 84.8 | −2.96 | +5.47 | Heavy color specks. |
| 2.5 | 69.7 | 77.1 | 89.6 | −3.11 | +5.66 | No color specks. |
| 10 | 68.7 | 77.5 | 89.7 | −3.26 | +7.12 | Do. |
| 25 | 71.8 | 79.8 | 90.7 | −1.47 | +6.09 | Do. |

The effectiveness of CHP in the deinking of difficult-to-deink material, as shown in Table I, was further indicated in another series of runs in which the cooking time and temperature were varied. Each set of time/temperature condition runs was performed with control samples containing no CHP and samples containing 10% CHP by volume in the alkaline cooking liquor. The results are as shown in Table II below.

TABLE II.—VARIATION IN COOKING TIME AND TEMPERATURE

| Test number | CHP in cook liquor, percent | Cooking | | Evaluation of paper following treatment | | | | | |
|---|---|---|---|---|---|---|---|---|---|
| | | Temp. (° F.) | Time (min.) | Hunter D-40 | | Hunter D-25 | | | Visual rating for specks and base sheet color |
| | | | | Blue | Green | L | (−)a | (+)b | |
| 1 | 0 | 170 | 60 | 61.5 | 68.2 | 84.1 | 3.49 | 5.02 | Very many color specks. |
| 2 | 10 | 170 | 60 | 70.3 | 78.1 | 90.2 | 3.64 | 6.15 | No color specks, pract. white. |
| 3 | 10 | 170 | 30 | 68.7 | 77.2 | 90.2 | 4.61 | 6.61 | No color specks, green tint. |
| 4 | 10 | 170 | 15 | 69.5 | 78.4 | 90.6 | 3.70 | 6.94 | Do. |
| 5 | 10 | 170 | 10 | 68.3 | 77.4 | 90.0 | 4.12 | 7.25 | Do. |
| 6 | 10 | 170 | 5 | 65.4 | 72.4 | 87.2 | 4.42 | 5.64 | Many tiny specks, green tint. |
| 7 | 0 | 150 | 60 | 58.9 | 64.5 | 81.8 | 3.35 | 3.75 | Very many color specks. |
| 8 | 10 | 150 | 60 | 70.3 | 78.7 | 90.7 | 3.65 | 7.09 | No color specks, pract. white. |
| 9 | 10 | 150 | 30 | 68.1 | 77.3 | 89.9 | 5.32 | 6.04 | Some green specks, green tint. |
| 10 | 10 | 150 | 15 | 63.0 | 71.0 | 85.8 | 6.54 | 4.78 | Some green flakes, moderately green. |
| 11 | 0 | 125 | 120 | 61.2 | 64.9 | 82.4 | 2.71 | 4.06 | Very many color specks. |
| 12 | 10 | 125 | 120 | 66.7 | 72.3 | 86.9 | 6.95 | 4.78 | Apprec. green flakes, slightly green. |
| 13 | 10 | 125 | 60 | 63.9 | 68.8 | 85.1 | 7.31 | 4.51 | Many green flakes, slightly green. |

The results shown in Table II show that the presence of N-cyclohexyl pyrrolidone in the cooking liquor is essential to the effective deinking and removal of color specks even under the maximum cooking conditions employed, namely 170° F. for 60 minutes. As shown by the results of Test No. 5, the cooking time at 170° F. can be reduced to 10 minutes with all color specks removed and very good results in the brightness measurements. Alternatively, Test No. 8 indicates that the temperature can be reduced to 150° F. with very good deinking effectiveness at a cooking time of 60 minutes under the test conditions employed. As shown by the results of from 11–13, the effectiveness of the deinking operation is reducd at a cooking temperature of 125° F. even when employing a longer cooking cycle. The cooking liquor composition of the present invention was, nevertheless, more effective than the conventional cooking liquor composition at such lower temperature conditions, at equal cooking cycles of 120 minutes and when employing a cooking cycle of 60 minutes for the composition of the present invention as compared with the 120 minute cycle for the control cooking composition.

In another set of similar runs under the indicated conditions, the deinking composition of the present invention was used in the deinking of other substrate materials in place of the color printed, over varnished label stock referred to above and used in the test runs set forth in Tables I and II. In these runs, the waste stock treated was mixd colored paper, photomount and phenolic waste stock. The mixed colored paper comprised light orange, deep orange, deep red, deep blue and light green, all 10 pt. board sized, 0.5 grams each color mixed for each test. The Photomount comprised 20 pt. white board coated on one side with a dark green heat shield adhesive. The Phenolic waste stock comprised phenol formaldehyde kraft board, 50% saturated, not cured. Red tray stock 20 pts., tan body separator 25 pts., 1.5 grams each type mixed with 3.0 grams total for each test. The brightness change is shown by the Hunter D-40 Blue filter reading and the Hunter D-25 L value. Color difference is shown by the Hunter D-25 a and b values. The results of this series of comparative runs are set forth in Table III below.

TABLE III.—VARIATION IN STOCK BEING TREATED

| Formula number | Type of waste stock treated | Volume percent of cyclohexyl pyrrolidone in cooking liquor | Evaluation of paper following treatment | | | | | |
|---|---|---|---|---|---|---|---|---|
| | | | Hunter D-40 | | Hunter D-25 | | | Visual rating for color and specks |
| | | | Blue | Green | L | a | b | |
| 1 | Mixed colors | 0 | 24.1 | 28.6 | 54.2 | +24.0 | +7.39 | Deep red, no specks. |
| 2 | do | 10 | 59.5 | 56.5 | 78.6 | +15.5 | +3.20 | Light pink, no specks. |
| 3 | Photomount | 0 | 30.6 | 43.5 | 67.6 | +1.80 | +14.2 | Medium tan, no specks. |
| 4 | do | 10 | 57.2 | 70.8 | 84.7 | +0.60 | +11.8 | Cream color, no specks. |
| 5 | Phenolic | 0 | 21.5 | 27.2 | 53.7 | +36.6 | +10.3 | Deep red, no specks. |
| 6 | do | 10 | 38.7 | 45.1 | 68.6 | +21.3 | +8.0 | Light pink, no specks. |

As seen by the results set forth in said Table III, the process and compositions of the present invention can be used with a high degree of effectiveness in the deinking of various grades of difficult-to-deink grade material, the specific results showing the high efficiency of dye color, heat seal adhesive and phenolic resin removal.

EXAMPLE 2

A deinking composition consisting of 30 ml. of 3% NaOH, 28 ml. of cyclohexyl pyrrolidone and 222 ml. of water was used to successively cook new 3.0 grams batches of the Fort Howard Deinking Stock referred to above for 1 hour at 170° F. After each cooking or deinking operation, the resultant pulp was defibered 2 minutes and formed into a sheet without further dilution. The cooking liquor extract from each sheet formation was reused in the cooking of a new 3.0 gram batch. The results are as set forth in Table IV below:

TABLE IV.—USE OF RECYCLE CHP

| Cooking cycle number | Hunter D-40 | | Hunter D-25 | | | Visual rating for specks and base sheet color |
|---|---|---|---|---|---|---|
| | Blue | Green | L | (−) a | (+) b | |
| 1 | 69.5 | 75.5 | 88.9 | 2.70 | 5.37 | No color specks, pract. white. |
| 2 | 70.4 | 77.5 | 89.3 | 3.30 | 5.39 | Do. |
| 3 | 69.2 | 77.0 | 89.3 | 4.12 | 5.51 | No color specks, green tint (trace). |
| 4 | 68.5 | 74.8 | 88.7 | 4.89 | 5.38 | No color specks, slightly green. |
| 5 | 68.1 | 75.5 | 88.7 | 5.25 | 5.42 | Trace color specks, slightly green. |
| 6 | 67.7 | 74.8 | 88.3 | 5.31 | 5.48 | Do. |
| Control | 61.5 | 68.2 | 84.1 | 3.49 | 5.02 | Very many color specks. |

The results shown in Table IV show that the aqueous deinking composition falling within the scope of the present invention can be recycled before effective deinking action in at least 6 separate deinking operations under the conditions specified. Subsequent investigation has shown that the cyclohexyl pyrrolidone is not consumed, as by selective adsorption, by the pulp being treated. The alkali component of the deinking composition is consumed, however, and must be replenished to maintain constant the proportions of ingredients employed in the subject deinking composition.

EXAMPLE 3

In another series of runs, the deinking process of the present invention was employed in the treatment of 3-part form material having 3 sheets of No. 4 Bond interleaved with carbon issues, having 75% by weight of said bond and 25% by weight of said tissue. The deinking was carried out on a laboratory scale as set forth in Example 1 and, using the same general procedures, in a small, 5 lb. semi-commercial beater in which the paper being deinked was cooked at 170° F. for a period of 10–15 minutes to defiber the waste paper. In the laboratory scale runs, the cooking cycle was 1 hour at 170° F. The results are as set forth in Tables V and VI below:

TABLE V.—DEINKING OF 3-PART FORM
[170° F. cook at 10-15 min. in 5-lb. beater]

| Trial number | NaOH, percent (OWF) | CHP in cooking liquor, volume percent | Hunter D-25 | | | Appearance |
|---|---|---|---|---|---|---|
| | | | L | a | b | |
| 1 | 10 | 0 | 65.1 | 2.88 | −3.46 | Blue, speckled. |
| 2 | 10 | 5 | 73.9 | 0.28 | 4.90 | Near white. |
| 3 | 10 | 3 | 76.0 | 0.74 | 4.97 | Near white. |
| 4 | 10 | 1 | 73.3 | 0.78 | 2.42 | Sl. blue tint. |
| 5 | 10 | 0.75 | 69.7 | 0.67 | −0.40 | Sl.→mod. blue tint. |

TABLE VI.—DEINKING OF 3-PART FORM
[170° F. cook for 1 hr. in blender]

| CHP in cooking liquor, volume percent | L | a | b | Appearance |
|---|---|---|---|---|
| 0 | 60.62 | 2.78 | −5.22 | Grey, some black specks. |
| 5 | 66.16 | 1.18 | −0.82 | Large blue spots. |

As can be seen from the results of said Tables V and VI above, relatively small amounts of the subject N-alkyl-lactam solvent are required in the aqueous deinking composition of the invention for effective deinking of the waste paper being treated. The results also indicate that the desired deinking effect is enhanced in the large scale deinking equipment, it being generally understood that the effectiveness of the aqueous deinking composition of the invention is enhanced in the carrying out of the invention in commercially available deinking equipment.

EXAMPLE 4

A further series of deinking runs was carried out using the above-mentioned 3-part form waste material cooked at 170° F. for 1 hour using a variety of inorganic salts in the aqueous deinking composition. The salts were added to the composition as 3% by weight solutions in water, with 30 ml. of the solution employed. 3 grams of the substrate material being deinked were employed per 280 grams of the overall aqueous deinking composition of the invention. The results are as set forth in Table VII below:

TABLE VII.—VARIATION IN INORGANIC SALTS EMPLOYED IN THE AQUEOUS DEINKING COMPOSITION

| Salt used | CHP volume[1] | Hunter D-25 | | | Appearance |
|---|---|---|---|---|---|
| | | L | a | b | |
| NaOH | 0 | 60.62 | +2.78 | −5.22 | Many large blue spots. |
| NaOH | 5 | 66.16 | +1.18 | −0.82 | Mod. spots, grey white. |
| KOH | 0 | 64.54 | +2.15 | −3.82 | Many large blue spots. |
| KOH | 5 | 65.66 | +1.38 | −1.28 | Mod. spots, grey white. |
| Ca(OH)$_2$ | 0 | 57.47 | +1.91 | −7.90 | Very many spots, blue. |
| Ca(OH)$_2$ | 5 | 66.20 | +1.85 | +0.82 | Mod. spots, grey white. |
| FeCl$_3$ | 0 | 54.91 | −0.44 | +9.84 | Very many spots, yellow color. |
| FeCl$_3$ | 5 | 59.32 | −0.74 | +12.99 | Mod. spots, yellow. |
| Al$_2$(SO$_4$)$_3$ | 0 | 57.47 | +1.17 | −11.14 | Very many spots. |
| Al$_2$(SO$_4$)$_3$ | 5 | 59.50 | +2.01 | −11.12 | Mod. spots. |

[1] Percent of deinking solution.

From the results set forth in Table VII, it can be seen that although NaOH is commonly employed in conventional deinking operations and is advantageous from an economic technical viewpoint, other commonly available inorganic salts may effectively be employed in the practice of the present invention. The presence of such soluble inorganic salts, having cations such as sodium, calcium, iron, aluminum, magnesium and the like, serve to reduce the solubility in water of the N-alkyl-lactam solvent employed at the cooking temperature employed. While the water thus serves as an appropriate carrier to assure adequate contacting of the paper being treated with the lactam solvent employed, the relatively low water solubility of the lactam solvent at the indicated deinking temperatures in the presence of soluble inorganic salts of the type set forth above enhances the effectiveness of the deinking operation. Thus, insoluble N-alkyllactam solvent is available for effective deinking of the moist paper with which it is brought into contact. In similar runs carried out as set forth in said Example 4, the addition of the cyclohexyl pyrrolidone to the deinking composition resulted in some visual improvement in the appearance of the treated pulp, reducing somewhat the number of small spots thereon, but did not favorably improve the brightness as indicated by the Hunter D-25 measurements. From these results, it can be inferred that preferred embodiments of the aqueous treating composition of the present invention will contain one or more of the water soluble, inorganic ionic salts disclosed and claimed herein having the indicated cations thereby present in the aqueous treating composition.

EXAMPLE 5

The above-mentioned procedure of Example 1 was employed in a series of test runs using 3.0 grams of the above-mentioned Fort Howard Deinking Stock in each run for treatment with aqueous deinking compositions containing t-Octyl - 2 - pyrrolidone, N-t-butylpyrrolidone and N-methylpyrrolidone as the N-alkyllactam solvent. The results of this series of runs are shown below in Table VIII:

TABLE VIII.—VARIATION IN N-ALKYLLACTAM SOLVENT

| Run number | 3% NaOH, ml. | Pyrr. in liquor, ml. | Pyrr. in liquor, vol. percent | H$_2$O, ml. | Evaluation of paper following deinking | | | | | |
|---|---|---|---|---|---|---|---|---|---|---|
| | | | | | Hunter D-40 | | Hunter D-25 | | | |
| | | | | | Blue | Green | L | (−)a | (+)b | Visual rating for base color and specks |
| 1 | 30 | 0 | | 0 | 250 | 63.1 | 68.5 | 84.9 | 2.92 | 4.59 | Very many specks. |
| 2 | 30 | 28 Cycolpyrr | 10 | 222 | 69.4 | 75.4 | 89.7 | 3.69 | 4.49 | Pract. white, no specks. |
| 3 | 30 | 14 Oct pyrr | 5 | 236 | 65.3 | 72.7 | 86.2 | 6.69 | 4.95 | Green tint, moderate green flakes. |
| 4 | 30 | 28 Oct pyrr | 10 | 222 | 66.6 | 71.5 | 86.5 | 6.69 | 3.85 | Green tint, moderate (+) green flakes. |
| 5 | 30 | 56 Oct pyrr | 20 | 194 | 69.7 | 74.9 | 87.1 | 5.17 | 3.81 | Green tint, slight green flakes. |
| 6 | 30 | 14 Butyl pyrr | 5 | 236 | 63.9 | 70.6 | 87.4 | 3.40 | 5.93 | Pract. white, moderate specks. |
| 7 | 30 | 28 Butyl pyrr | 10 | 222 | 70.9 | 77.5 | 90.3 | 2.78 | 5.80 | Pract. white, sli.-moderate specks. |
| 8 | 30 | 56 Butyl pyrr | 20 | 194 | 67.6 | 71.8 | 87.0 | 3.68 | 4.40 | Pract. white, apprec. specks. |
| 9 | 0 | 28 Oct pyrr | 10 | 252 | 65.5 | 69.2 | 84.9 | 2.68 | 3.42 | Very many specks. |
| 10 | 0 | 28 Butyl pyrr | 10 | 252 | 60.5 | 62.3 | 81.0 | 3.31 | 1.79 | Do. |

From the results set forth in Table VIII, it can be seen that effective deinking is accomplished with either N-cyclohexyl pyrrolidone, N-t-butyl-pyrrolidone or t-octyl-2-pyrrolidone as the N-alkyllactam solvent employed in the aqueous deinking composition of the invention. N-t-butyl-pyrrolidone is found to be additionally advantageous in that its use in the deinking operation results in very high foam development of significance with respect to flotation-type deinking operations. N-octyl-pyrrolidone, although of lesser foam producing capability, nevertheless forms a very stable surface foam during the deinking, or cooking, operation. The foam serves to hold fiber fines, pigment and other suspended matter at the surface, facilitating removal by raking or such mechanics commonly employed in flotation deinking operations.

EXAMPLE 6

N-methylpyrrolidone was also employed in the deinking of a 3.0 gram batch of the Fort Howard Deinking Stock using the general procedures of Example 1. The results were as set forth in Table IX below:

TABLE IX.—N-METHYLPYRROLIDONE AS N-ALKYLLACTAM DEINKING SOLVENT

| Run number | Formula composition, ml. | | | | Evaluation of paper following deinking | | | | | |
|---|---|---|---|---|---|---|---|---|---|---|
| | 3% NaOH | 20% NaOH | M-pyrol | H$_2$O | Hunter D-40 | | Hunter D-25 | | | Visual rating for base sheet color and specks |
| | | | | | Blue | Green | L | a | b | |
| 1 | 30 | 0 | 0 | 250 | 60.7 | 65.4 | 82.9 | −3.60 | +4.20 | Very many specks. |
| 5 | 0 | 4.5 | 250 | 0 | 45.4 | 59.3 | 78.6 | +0.78 | +12.78 | Medium tan, no specks. |

The results set forth in Table IX show that the deinking of the waste paper stock employing about 97% by weight N-methyl pyrrolidone was effective in removing all specks from the treated paper, whereas a conventional cooking liquor having an equivalent alkali content, while advantageous in some brightness measurements, did not remove all specks, but left many specks as were readily apparent on visual analysis.

The effectiveness of N-alkyllactam solvents, when employed in aqueous deinking compositions in accordance with the teachings of the invention, represents a major advance in reclaiming plastic-treated papers. Even when such difficult-to-deink grade material is present in very small quantities, it can spoil otherwise acceptable waste paper if not effectively deinked. In continuous deinking operations, as in the embodiments illustrated in the drawing, it is highly important from an overall economic viewpoint to regenerate and reuse the N-alkyllactam solvent to the fullest possible extent. In this regard, it is significant to note that the N-alkyllactam solvent is not consumed or destroyed in the deinking operation. The aqueous deinking solution pressed from the treated pulp can generally be recycled to the pulper at least eight times without regeneration, alkali, or other additional inorganic components referred to above, is consumed and will be supplemented with make-up material to maintain a desired concentration thereof. In commercial applications of the invention, the amount of aqueous deinking composition recycled from the press to the pulper may vary depending upon a number of factors such as the consistency utilized in the pulper, the pulp shrinkage, the desired consistency leaving the press, the particular grade of paper being treated, the particular aqueous deinking composition employed, the operating conditions and the like. In general, however, the amount of said deinking composition recycled from the press to the pulper will constitute a major portion of the deinking composition content of the pulp fed to the press. The said recycle aqueous deinking composition will thus generally be at least 50% by weight, typically from about 50% to about 75% by weight, of the deinking composition withdrawn from the pulper. The remaining deinking composition passes to the washing zone with the treated pulp and is thereafter recovered, regenerated and recycled to the pulper as herein provided.

N-alkyllactam solvent present in the wash water solution can be recovered as by concentration of said solution and distillation thereof to produce a purified lactam solvent stream for recycle and reuse in the contacting of additional quantities of the waste paper being treated. In particularly advantageous embodiments of the invention, the simplified regeneration techniques disclosed above and illustrated in the drawing can be employed because of the phase separation, or cloud point characteristics, of particular N-alkyllactam solvents. As previously indicated, aqueous solution of N-cyclohexyl pyrrolidone, N-t-butyl pyrrolidone and t-octyl-2-pyrrolidone containing dissolved waste materials will undergo such advantageous phase separation at particular cloud point temperatures dependent on the concentration thereof in the aqueous wash solution, the amount and nature of the wastes associated therewith, etc. For as complete solvent recovery and reuse as possible, the water-rich layer formed by such desirable phase separation will be recycled for further use in the pulping zone. It will be appreciated that the solvent content of the water layer, which will generally be small but of importance from an overall economic viewpoint, will vary depending upon the materials employed and the operating conditions pertaining to a given deinking-solvent regeneration operation. In a typical illustrative example, presented simply to indicate a representative breakdown of solvent distribution in the two separate and distinct layers, a cyclohexyl pyrrolidone and water wash solution, having particular wastes therein and maintained at about 200° F., may separate into a water-rich layer comprising about ¾ of the total volume of said wash solution and containing about 7.5% solvent based on the total volume of said water-rich layer, and a solvent-rich layer comprising about ¼ of the total volume of said wash solution and containing about 50% solvent based on the total volume of said solvent-rich layer. As herein provided, essentially all of the solvent is recycled to the pulping zone in preferred embodiments of the invention. It should be noted that, with respect to various examples hereinabove set forth using N-cyclohexyl pyrrolidone, the specific gravity of the solvent is approximately the same as that of water, the proportions of said solvent expressed in percent by volume being approximately the same as the proportion of said solvent expressed in percent by weight.

The aqueous treating compositions herein disclosed and claimed for use in the deinking of waste paper have also been found to be of advantage in other novel applications of commercial significance. Thus, aqueous solutions containing the subject N-alkyllactam solvents can be employed in the pulping of wood chips, the bleaching of crude pulp, the washing of brown stock to increase fine screen yield and reduce sulfate losses, the removal of natural and synthetic color bodies from pulp and paper mill effluents and white. Other potential applications of such aqueous treating compositions are in improving the dissolving and extrusion characteristics pertaining to the conversion of cellulose to xanthate, viscose, and cellophane, in adhesives and in printing ink vehicles, plasticizers and the like in the general field of pulp and paper treatment and conversion. In the pulping of wood chips, the aqueous treating composition of the invention containing the subject N-alkyllactam solvent can be employed in conventional paper mill equipment, in which evoking times on the order of about six hour sat about 330° F. and about 100 p.s.i.g. are employed in typical operations, in achieving lower cooking cycles, improved pulp yield and/or quality, more favorable operating conditions or some combination of such desirable features in the treatment of various grades of wood chips.

The reclamation of waste materials is of ever increasing significance and importance in all aspects of industrial and economic activities. The reclamation of waste paper is of particular concern and importance in light of the tremendous modern usage of paper and paper products. Full utilization of waste paper through reclamation procedures is impaired, however, by the increasing use of difficult-to-deink grade material, as in thermoplastic or elastomeric treated paper. As indicated above, even a relatively small quantity of such difficult-to-deink grade material can spoil an otherwise acceptable batch of waste paper. For general acceptance in commercial deinking operations, a deinking composition and/or technique should desirably be effective in use with respect to a widely diverse range of waste papers containing specialized plastic or wax coatings, adhesives, waxes, inks and the like. Such techniques must also, of course, be economically feasible and, as such, generally necessitate effective regeneration and reuse of solvents or other such components employed in place of or in addition to conventional deinking ingredients. The process and compositions of the present invention are highly effective, useful with respect to a wide range of waste paper materials, particularly of advantage in the deinking of difficult-to-deink grade materials, and capable of essentially complete solvent recovery, regeneration and reuse in continuous deinking operations. This highly desirable combination of effective deinking in applications for which conventional techniques are generally not suited, together with economical regeneration and compatibility with commonly available capital equipment, renders the present invention of great significance in the field of waste paper reclamation. The environmental importance of the invention in the reclamation of the increasing quantities of wastes comprising difficult-to-deink grade material is enhanced by the essentially complete recovery of the N-alkyllactam solvents. Thus, the practice of the invention not only tends to minimize any inadvertent waste material discharge, as in wash water effluent, but likewise obviates any undesired contamination of said effluent by the treating solvent itself. The invention thus represents a major industrial and environmental advance in the reclamation of paper waste materials.

Therefore, we claim:

1. A process for the deinking of waste paper comprising contacting the waste paper to be deinked with an aqueous treating composition containing an N-alkyllactam solvent having from 1 to 16 carbon atoms in the alkyl group at a temperature of from about 110° F. to 210° F., said solvent being present in an amount within the range of from about 0.5% to about 99.5% by weight based on the total weight of said aqueous treating composition, whereby the waste paper is effectively deinked, said N-alkyllactam solvent being recoverable for use in the treatment of additional quantities of waste paper, said process being of particular advantage in the treatment of coated or otherwise difficult-to-deink grade waste paper.

2. The process of Claim 1 in which the amount of waste paper treated being in the range of from about 1% to about 20% by weight based on the weight of said aqueous treating composition employed.

3. The process of Claim 2 in which said N-alkyllactam comprises an N-lower cycloalkyl pyrrolidone.

4. The process of Claim 3 in which said N-lower cycloalkyl pyrrolidone comprises N-cyclohexyl pyrrolidone.

5. The process of Claim 4 in which N-cyclohexyl pyrrolidone is employed in an amount within the range of from about 0.5 to about 25% by weight based on the total weight of said aqueous treating composition.

6. The process of Claim 2 in which said aqueous treating composition comprises from about 0.5 to about 200 parts by weight of water, from about 0.05 to about 1 part by weight of a water-soluble, non-volatile inorganic ionic compound that is non-reactive with said N-alkyllactam solvent, said inorganic ionic compound containing a cation taken from the group consisting of sodium, potassium, calcium, iron, aluminum and magnesium, and from about 1 to about 99 parts by weight of said N-alkyllactam solvent.

7. The process of Claim 6 in which said N-alkyllactam comprises an N-lower alkyl pyrrolidone.

8. The process of Claim 7 in which said N-alkyllactam comprises an N-lower cycloalkyl pyrrolidone.

9. The process of Claim 7 in which said treating temperature is from about 120° F. to about 200° F.

10. The process of Claim 7 in which the N-alkyllactam solvent content of the aqueous treating composition is from about 1 to about 50 parts by weight.

11. The process of Claim 10 in which said N-alkyllactam solvent comprises N-cyclohexyl pyrrolidone.

12. The process of Claim 11 in which said N-cyclohexyl pyrrolidone is employed in an amount within the range of from about ¾ to about 25% by weight based on the total weight of said aqueous treating composition.

13. The process of Claim 10 in which said N-alkyllactam solvent comprises N-methyl pyrrolidone.

14. The process of Claim 10 in which said N-alkyl pyrrolidone comprises N-t-butyl pyrrolidone.

15. The process of Claim 14 in which said N-alkyllactam solvent is employed in an amount within the range of from about ¾% to about 25% by weight based on the total weight of said aqueous treating composition.

16. The process of Claim 10 in which N-alkyllactam solvent comprises N-t-octyl-2-pyrrolidone.

17. The process of Claim 6 in which said cation comprises sodium.

18. The process of Claim 17 in which said ionic compound comprises sodium hydroxide.

19. The process of Claim 11 in which said ionic compound comprises sodium hydroxide.

20. The process of Claim 14 in which said ionic compound comprises sodium hydroxide.

21. The process of Claim 19 in which said treating temperature is from about 150° F. to about 170° F.

22. An improved process for the deinking of waste paper comprising:
(a) contacting the waste paper to be deinked with an aqueous treating composition containing an N-alkyllactam solvent present in an amount within the range of from about 0.5% to about 99.5% by weight based on the total weight of said aqueous treating composition, said solvent being taken from a group consisting of N-cyclohexyl pyrrolidone, N-t-octyl pyrrolidone and N-t-butyl pyrrolidone at a temperature of from about 110° F. to about 210° F. in a pulping zone;
(b) separating a major portion of the used aqueous treating composition from the resultant treated waste paper pulp;
(c) recycling said used aqueous treating composition separated from said treated pulp to the pulping zone for contact with additional quantities of waste paper to be deinked;
(d) washing said treated pulp with water in a washing zone to remove residual quantities of said aqueous treating composition therefrom;
(e) maintaining the aqueous wash solution in a quiescent zone at a solution concentration and temperature such as to result in the separation of said solution into a first, water-rich phase and a second lactam solvent-rich phase having a substantial portion of the waste materials removed from the deinked paper contained therein;
(f) removing said waste materials from the lactam-rich phase in a solvent purification zone, thereby providing a purified N-alkyllactam solvent-water phase suitable for recycle to said pulping zone,
whereby the waste paper to be treated is effectively deinked and the recovery of the N-alkyllactam solvent is facilitated, said process being of particular advantage in the treatment of coated or otherwise difficult-to-deink grade waste paper.

23. The process of Claim 22 in which said N-alkyllactam solvent comprises N-cyclohexyl pyrrolidone.

24. The process of Claim 22 in which said N-alkyllactam solvent comprises N-p-octyl pyrrolidone.

25. The process of Claim 22 in which said N-alkyllactam comprises N-t-butyl pyrrolidone.

26. The process of Claim 22 in which said aqueous treating composition is contacted with the waste paper to be deinked at a temperature of from about 120° F. to about 200° F.

27. The process of Claim 22 in which said N-alkyllactam solvent is present in an amount within the range of from about ¾% to about 25% by weight based on the total weight of said aqueous treating composition.

28. The process of Claim 22 in which said aqueous treating composition comprises from about 0.5 to about 200 parts by weight of water, from about 0.05 to about 1 part by weight of a water-soluble, non-volatile inorganic ionic compound that is non-reactive with said N-alkyllactam solvent, said inorganic ionic compound containing a cation taken from the group consisting of sodium, potassium, calcium, iron, aluminum and magnesium, and from about 1 to about 99 parts by weight of said N-alkyllactam solvent, and including evaporating water from the aqueous wash solution from said washing zone in an evaporation zone to concentrate said aqueous wash solution, the resulting hot concentrated wash solution being maintained at a temperature of at least the cloud point temperature of the concentrated wash solution in said quiescent zone, wherein said concentrated solution separates into said first water-rich phase and said second solvent-rich phase.

29. The process of Claim 28 in which said inorganic compound comprises sodium hydroxide.

30. The process of Claim 29 in which said N-alkyllactam solvent comprises N-cyclohexyl pyrrolidone.

31. The process of Claim 29 in which said N-alkyllactam solvent comprises N-t-butyl pyrrolidone.

32. The process of Claim 29 in which said N-alkyllactam solvent comprises N-t-octyl pyrrolidone.

33. The process of Claim 28 and including recycling the purified N-alkyllactam solvent-water phase from the solvent purification zone to said pulping zone.

34. The process of Claim 33 and including recycling said water-rich phase to said pulping zone.

35. The process of Claim 29 in which said N-alkyllactam solvent is present in an amount within the range of from about ¾% to about 25% by weight based on the total weight of said aqueous treating composition.

36. The process of Claim 35 in which said N-alkyllactam solvent comprises N-cyclohexyl pyrrolidone.

(References on following page)

References Cited

UNITED STATES PATENTS

| | | | |
|---|---|---|---|
| 1,993,362 | 3/1935 | Crisp | 162—5 |
| 3,226,343 | 12/1965 | Rhodes | 162—5 X |
| 3,378,465 | 4/1968 | Brandt et al. | 260—326.5 FN |
| 3,644,402 | 2/1972 | Takagi et al. | 260—326.5 FN |
| 3,272,689 | 9/1966 | Lenz | 162—72 |
| 2,964,535 | 12/1960 | Clements | 260—326.5 FN |
| 3,354,027 | 11/1967 | Hossain et al. | 162—5 |
| 2,945,863 | 7/1960 | Buc et al. | 162—72 X |
| 3,354,026 | 11/1967 | Illingworth | 162—5 |
| 3,231,576 | 1/1966 | Falbe et al. | 260—326.5 FN |

FOREIGN PATENTS

| | | | |
|---|---|---|---|
| 594,981 | 3/1960 | Canada | 252—364 |

OTHER REFERENCES

Casey: Pulp & Paper, Vol 1, pp. 379, 382, 383, 384, 387, 388, Interscience, New York, 1960.

S. LEON BASHORE, Primary Examiner

W. F. SMITH, Assistant Examiner

U.S. Cl. X.R.

162—8; 252—364